INVENTOR.
Oliver P. Knebel 3,167,861
TOOL
Oliver P. Knebel, 10459 Sappington Lane,
St. Louis County, Mo.
Filed Nov. 18, 1963, Ser. No. 324,260
2 Claims. (Cl. 30—294)

This invention relates to a hand operated tool and more particular to such a tool for use in installing seat belts in automobiles.

It is generally accepted that increased safety results when seat belts are utilized by the occupants of an automobile. Such seat belts are designed to be secured around the waists of the occupants of the vehicle and thereby prevent the occupant from being drawn forward in event of a sudden stop or from being tossed around or thrown out of the vehicle in the event it turns over.

To be effective the seat belt must be secured to the floor or frame of the automobile and extend up between the seat back and seat bottom so that it can be fastened about the waist of the occupant to hold the occupant in the seat. The seat back and seat bottom are normally connected by fabric, leather, or the like, which must be pierced in order for the seat belt to extend up from the floor and between the seat bottom and seat back. Considerable difficulty has been encountered in piercing such fabric, or the like, in the exact position needed and in threading of the seat belt between the seat back and seat bottom. Another difficulty encountered is that metal coil springs, or the like, are usually in or close to the required path for threading the seat belt.

It is another object of my invention to provide a tool for installing such seat belts in automobiles, which overcomes such problems heretofore encountered. Another object of my invention is to provide a tool for piercing the fabric, or the like, between an automobile seat back and seat bottom at the desired location for the installation of a seat belt and for threading such seat belt through such opening between the seat back and seat bottom.

An example of the invention is illustrated in the accompanying drawing wherein.

Figure 1:
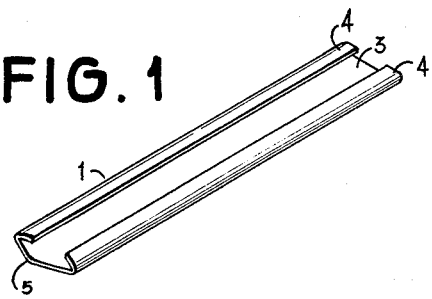
FIGURES 1 and 2 are perspective views of a guiding sheath and knife, respectively, illustrating an embodiment of the invention.
Figure 2:
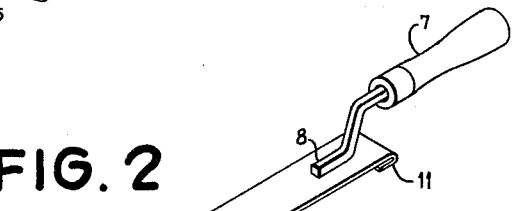

According to the invention the tool comprises a guiding sheath 1 and a knife 2. In the example illustrated, the sheath 1 is a relatively rigid, elongated, flat member 3 whose edges 4 along the length are curved upwardly and inwardly, and the forward edge of the flat 3 is preferably pointed or curved as at 5. The knife 2 has a flat portion 6, which is shorter and narrower than the sheath 1, a handle 7 secured to the flat portion 6 as at 8, a point 9 whose curved or tapered edges 10 are sharp knife edges, and downwardly extending flange 11.

In operation, the knife 2 has its blade end 9 inserted at the rear end of the sheath 1 on top of the flat 3 but with the lateral edges extending under the curved edges 4. The sheath and knife dimensions are such that the longitudinal edges of the knife extend laterally under the curved edges 4 of the sheath and the space between the curved edges 4 of the sheath is such as to accommodate the handle 7. The sheath thus forms a channel, or passageway slotted on one side, in which the knife can be freely moved forwardly or rearwardly.

Figure 3:
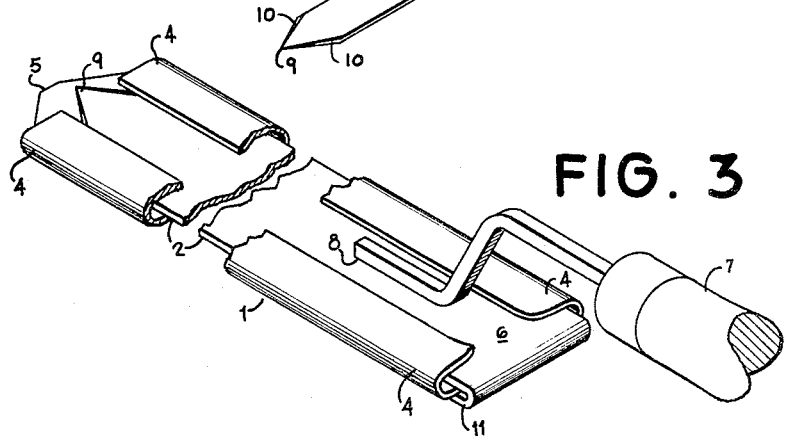
FIGURE 3 is a perspective view, partly cut away, illustrating an asesmbly of the shield and knife of FIGURES 1 and 2, respectively, in which the knife is in position locked to prevent forward movement of the knife within the shield.
Figure 4:
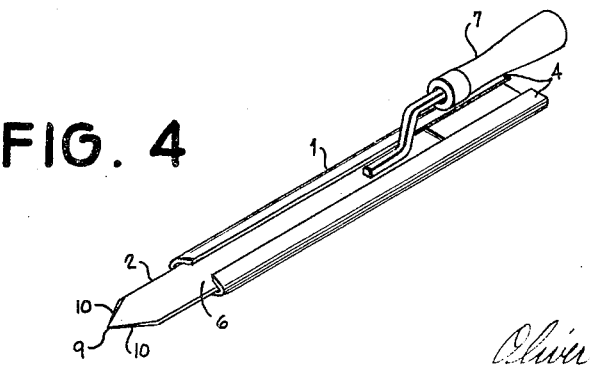
FIGURE 4 is a perspective view illustrating an assembly of such knife and sheath with the knife in a position extended forwardly from the sheath.

After the point of the knife has been inserted in the rear end of the sheath, the knife is moved forwardly until stopped by the flange 11 engaging the rear edge of the flat 3 of the sheath, as illustrated in FIGURE 3. With the flange 11 engaging the flat 3, it will be noted that the point of the knife is within the sheath channel rearwardly of the leading edge 5 of the sheath. The tool is now assembled for initiating the insertion between the back and bottom of the automobile seat. The end 5 of the tool is placed between the cushion and backrest where the seat belt is to pass through. While the sheath is held by hand in this position the knife is moved rearwardly by means of handle 7 until the flange 11 is disengaged from the flat 3 of the sheath. The space between the curved edges 4 and the flat 3 of the sheath is sufficient to accommodate both the flat 6 of the knife and flange 11. Accordingly by means of the handle 7 the knife is then lifted upwardly until the flange is above the edge of the flat 3 and is moved forwardly within the channel of the sheath until the blade edge 9 protrudes from the leading edge of the sheath and perforates the seam or fabric or the like, making a slot for the sheath to pass through. The knife is then again pulled rearwardly and removed from the sheath. The sheath is then pushed through the perforation formed by the knife and between the spring coils, in a direction toward the extreme lower edge of the backrest of the seat. The knife is removed from the sheath during this operation as a safety precaution. The sheath is then wiggled between the no-sag springs and below the steel rim until the end 5 is pushing the fabric or the like where it is desired that the seat belt protrude from the seat body. Next the knife is reinserted in the sheath and pushed forwardly through the sheath to provide a neat slice or perforation through the fabric or the like. The knife is then moved rearwardly until the stop 11 is in engagement with the end of the sheath, and the assembly is pushed forward until the sheath extends through the perforation and protrudes from both sides of the body of the seat.

With the sheath in the position of protruding from both the front and back of the seat the knife 2 by means of the handle 7 is withdrawn completely from the sheath 1. The sheath in this position then forms a channel or sleeve suitable for slipping or threading the seat belt through the body of the seat. After the seat belt extends from both ends of the sheath the sheath can be removed without disturbing the positioning of the seat belt and the sheath and knife can again be assembled as above to successively repeat the operation. The width of the sheath has the dimension desired for the particular seat belt to be installed, such seat belts normally being of flat, woven, tape-like, flexible construction. After reremoval of the sheath from the body of the seat the further installation of the seat belt can be accomplished in the usual manner by attaching the lower end protruding from the body of the seat to the floor of the automobile.

It will thus be seen that the knife and sheath are so designed and constructed as to co-act in accomplishing the desired perforation, and location thereof, between the back and bottom of the seat, and that the threading of the seat belt through said perforation is greatly facilitated, eliminating the problems encountered heretofore in such installations.

While the invention has been described in detail it will be clear that various modifications may be made thereof without departing from the spirit and scope of the invention. For example the flange 11 could extend upwardly instead of downwardly on the knife or be any suitable tab-like construction to provide the necessary stop.

Having thus described the invention, what is claimed and desired to be covered by U.S. Letters Patent is:

1. A tool for perforating and threading a flexible member through the body of an automobile seat comprising in combination a knife and a sheath therefor; said knife being an elongated flat member having substantially the width of the passageway internal of said sheath but slideable therein and having a pointed knife edge extending completely across the forward end thereof, a stop for engaging said sheath at the opposite end thereof, and a handle secured to the body of the knife and positioned adjacent said opposite end thereof; said sheath being a slotted, channel-like, rigid open-ended member longer than said knife permitting said knife to be moved freely forwardly and backwardly therewithin and to be removed and reinserted from either end thereof when said stop is not in engagement with said sheath said channel having a depth sufficient to accommodate both said knife and said stop in the disengaged position.

2. The tool of claim 1 wherein said sheath is an elongated, flat member whose longitudinal edges extend upwardly out of the plane of the member and inwardly toward each other.

References Cited in the file of this patent
UNITED STATES PATENTS

| | | | |
|---|---|---|---|
| 1,434,388 | 11/22 | Hughes | 30—162 X |
| 1,887,188 | 11/32 | Ross | 30—162 |
| 2,548,797 | 4/51 | Ingwer et al. | 30—162 |

WILLIAM FELDMAN, *Primary Examiner.*